(12) United States Patent
Kim

(10) Patent No.: US 10,663,851 B2
(45) Date of Patent: May 26, 2020

(54) STEREOSCOPIC IMAGE DISPLAY DEVICE

(71) Applicants: Sang Su Kim, Gunpo-si (KR); Kim Hung Yu, Kowloon Hong Kong (HK)

(72) Inventor: Sang Su Kim, Gunpo-si (KR)

(*) Notice: Subject to any disclaimer, the term of this patent is extended or adjusted under 35 U.S.C. 154(b) by 0 days.

(21) Appl. No.: 16/087,105

(22) PCT Filed: Mar. 17, 2017

(86) PCT No.: PCT/KR2017/002897
§ 371 (c)(1),
(2) Date: Sep. 21, 2018

(87) PCT Pub. No.: WO2017/164571
PCT Pub. Date: Sep. 28, 2017

(65) Prior Publication Data
US 2019/0107728 A1 Apr. 11, 2019

(30) Foreign Application Priority Data

Mar. 24, 2016 (KR) .................. 10-2016-0035264

(51) Int. Cl.
*G02B 27/28* (2006.01)
*G03B 21/606* (2014.01)
(Continued)

(52) U.S. Cl.
CPC ......... *G03B 21/606* (2013.01); *G02B 5/3083* (2013.01); *G02B 27/22* (2013.01);
(Continued)

(58) Field of Classification Search
CPC ............... G02B 27/22; G02B 27/2235; G02B 27/2242; G02B 27/26; G02B 27/283;
(Continued)

(56) References Cited

U.S. PATENT DOCUMENTS 7,857,455 B2 12/2010 Cowan et al.
7,905,602 B2 3/2011 Schuck et al.
(Continued)

FOREIGN PATENT DOCUMENTS

KR 10-2009-0089325 8/2009
KR 10-2009-0094224 9/2009
(Continued)

OTHER PUBLICATIONS

Preliminary report on patentability PCT/KR2017/002897.
Search Report PCT/KR2017/002897.

*Primary Examiner* — Cara E Rakowski
*Assistant Examiner* — Magda Cruz
(74) *Attorney, Agent, or Firm* — Reches Patent

(57) ABSTRACT

The present invention relates to a stereoscopic image display through which after the incident light incident from a projector lens is split into different lights according to polarized components, by selectively delaying the phase of each split light by a predetermined value through an on/off operation of an optical switch module, each light is converted to have the same polarized component, and the synthesized light obtained by synthesizing the lights having the same polarized component is projected on a screen so as to double the luminance on the screen.

14 Claims, 4 Drawing Sheets

(51) Int. Cl.
- *G02B 27/22* (2018.01)
- *H04N 13/363* (2018.01)
- *H04N 13/337* (2018.01)
- *G02B 27/26* (2006.01)
- *H04N 13/332* (2018.01)
- *G02B 5/30* (2006.01)

(52) U.S. Cl.
CPC ..... *G02B 27/2235* (2013.01); *G02B 27/2242* (2013.01); *G02B 27/26* (2013.01); *G02B 27/283* (2013.01); *H04N 13/332* (2018.05); *H04N 13/337* (2018.05); *H04N 13/363* (2018.05)

(58) Field of Classification Search
CPC .... G02B 5/3083; H04N 13/30; H04N 13/332; G03B 21/604; G03B 21/606
See application file for complete search history.

(56) References Cited

U.S. PATENT DOCUMENTS

| | | |
|---|---|---|
| 2006/0007537 A1 | 1/2006 | Sedmayr |
| 2011/0188115 A1* | 8/2011 | Sharp ............... B29D 11/00644 359/465 |
| 2015/0103318 A1 | 4/2015 | Lee et al. |
| 2016/0124238 A1* | 5/2016 | Hoang ............... G02B 26/0825 353/8 |
| 2016/0295201 A1* | 10/2016 | So ........................ H04N 13/327 |

FOREIGN PATENT DOCUMENTS

| | | |
|---|---|---|
| KR | 10-1387097 | 4/2014 |
| WO | WO2008042798 | 4/2008 |
| WO | WO2008048494 | 4/2008 |
| WO | WO2014163322 | 9/2014 |
| WO | 2015133732 | 9/2015 |
| WO | WO2015133732 | 9/2015 |

* cited by examiner (a)

(b)

(c)

(a)

(b)

STEREOSCOPIC IMAGE DISPLAY DEVICE

TECHNICAL FIELD

The present invention relates to a stereoscopic image display device, and more particularly, to a stereoscopic image display device through which after the incident light incident from a projector lens is split into different lights according to polarized components, by selectively delaying the phase of each split light by a predetermined value through an on/off operation of an optical switch module, each light is converted to have the same polarized component, and the synthesized light obtained by synthesizing the lights having the same polarized component is projected on a screen so as to double the luminance on the screen.

BACKGROUND ART

Recently, 3D broadcasting channels, 3D games, and 3D movies using 3D effects such as broadcasting, games, and movies receive attention, and the recently released home TVs or monitors support 3D stereoscopic video playback, thereby making it easy for the general public to see 3D stereoscopic images.

Such 3D stereoscopic images use a binocular parallax that occurs due to differences in the images of the left and right sides as the eyes of a person are separated by a distance of 6.5 cm, and in order to do this, two cameras spaced the same distance as the eyes of a person apart from each other capture images simultaneously, and the image captured through the left camera and the image captured through the right camera are reproduced on one monitor, and a user who wears a 3D glasses will see only the left image with the left eye and the right image with the right eye, so that it is possible for the user to feel a 3D feeling (perspective) as the user's brain is mistaken for viewing the left and right images reproduced at a high speed simultaneously.

Meanwhile, a method of reproducing such a 3D stereoscopic image may be largely divided into a method of wearing a glasses and a method of wearing no glasses, and the method of wearing a glasses may be divided into a shutter glass method and a polarizing method.

First, the shutter glass method is a method of rapidly reproducing only the left image in odd numbered pixels at 120 Hz and the right image in even numbered pixels at 120 Hz alternately through a monitor capable of reproducing 240 Hz, that is, 240 frames per second, and an infrared transmitter (emitter) in the monitor applies a signal to the 3D glasses, and in the 3D glasses, the processes of closing the right glass of the 3D glasses when the left image is reproduced and closing the left glass of the 3D glasses when the right image is reproduced are rapidly repeated, thereby allowing a user to have 3D feeling.

Next, in the polarizing method, by splitting horizontal scan lines by each column, only the left image is reproduced in the odd-numbered columns and only the right image is reproduced in the even-numbered columns, and only the odd-numbered columns are polarized in the left glass of the 3D glasses and only the even-numbered columns are polarized in the right glass of the 3D glasses, thereby allowing a user to have 3D feeling.

However, the conventional 3D stereoscopic effect using such a polarization method has a problem in that incident light has to be shielded according to a polarized component (vertical or horizontal) due to the characteristics of a polarization element and according thereto, the luminance of the incident light is lowered.

In order to solve such a problem, conventionally, a polarizing beam splitter (PBS) is used to split an incident light according to a polarized component and delay the phase of the split light through an optical switch element and a polarization rotator in order to allow each light to be a synthesized light composed of lights having the same type of polarized component, thereby preventing a decrease in brightness.

However, in such a conventional technique, the case of a liquid crystal (LC) panel used for an optical switch element has the following problems in 1) in order to selectively polarize vertical and horizontal lights, a structure of a plurality of overlapping LC panels should be provided and thus a thickness thereof becomes thicker, 2) the structure is complicated because all the characteristics that each LC panel has should be considered while a plurality of LC panels are overlapped with each other without separation, and 3) the luminance is reduced due to the use of a plurality of LC panels.

In addition, since the surface of the above-mentioned PBS forms the same coating layer in the conventional technique, as the incident angle of the light incident on the PBS becomes different from each other according to the central portion side and both-side end portions of the PBS, the performance of the PBS is significantly reduced toward the both-side end portions.

In addition, in order to compensate for the inherent viewing angle that an optical switch device has, an additional wide view film should be used, and the quality of an image is deteriorated due to the use of the wide view film.

Accordingly, in order to solve the problems of the conventional 3D stereoscopic image reproducing technology, the inventor invents a stereoscopic image display device for splitting the incident light into different lights according to polarized components, subsequently converting each light to have the same polarized component by selectively delaying the phase of each split light by a predetermined value through an on/off operation of an optical switch module, and projecting a synthesized light obtained by synthesizing the lights having the same polarized component on a screen so as to double the luminance on the screen.

DISCLOSURE OF THE INVENTION

Technical Problem

The present invention is to solve the above-mentioned problems and provides a stereoscopic image display device through which after the incident light incident from a projector lens is split into different lights according to polarized components, by selectively delaying the phase of each split light by a predetermined value through an on/off operation of an optical switch module, each light is converted to have the same polarized component, and the synthesized light obtained by synthesizing the lights having the same polarized component is projected on a screen so as to double the luminance on the screen.

Technical Solution

In embodiments of the present invention, a stereoscopic image display device includes: a light splitter configured to split an incident light transmitted from a projector into a first polarized light and a second polarized light according to a polarization component and then transmit the first polarized light and reflect the second polarized light in at least one direction; a first optical switch module configured to delay and output a phase of the first polarized light, or further delay the phase to convert the first polarized light into the second polarized light and output the converted second polarized light; a second optical switch module configured to delay a phase of the second polarized light reflected in the at least one direction and output the second polarized light, or further delay the phase to convert the second polarized light into the first polarized light and output the converted first polarized light; and a light reflection module configured to reflect the second polarized light reflected in the at least one direction from the light splitter toward a direction of the second optical switch module.

In an embodiment, the light splitter may have at least one split surface corresponding to an incident angle of an incident light, and the light splitter may have a specific pattern shape through the at least one split surface.

In an embodiment, at least a portion of the at least one split surface may be coated with a reflective layer in correspondence to the incident angle of the incident light.

In an embodiment, the first and second optical switch modules may have both-side end portions bent in a shape curved in one side direction.

In an embodiment, the first and second optical switch modules selectively may output any one of the first polarized light and the second polarized light in synchronization with an image frame transmitted from the projector.

In an embodiment, the first optical switch module may include: a horizontally polarizing plate configured to linearly polarize the first polarized light in a horizontal direction; a first liquid crystal (LC) panel configured to delay a phase of the linearly-polarized first polarized light by $\lambda/2$ as a voltage corresponding to a first level is applied to convert the first polarized light into the second polarized light and output the second polarized light; and a first phase delaying member configured to further delay the second polarized light by $\lambda/4$ to output a circular polarized light.

In an embodiment, the first phase delaying member may be a quarter wave delaying film.

In an embodiment, when a voltage corresponding to a first level is applied to the first LC panel, the first LC panel may transition to an on state, and when a voltage corresponding to a second level is applied, transition to an off state.

In an embodiment, the first LC panel selectively may output the first polarized light or the second polarized light depending on whether a voltage corresponding to the first level or the second level is applied.

In an embodiment, the second optical switch module may include: a vertically polarizing plate configured to linearly polarize the second polarized light in a vertical direction; a second LC panel configured to delay a phase of the linearly-polarized second polarized light by $\lambda/2$ as a voltage corresponding to a first level is applied to convert the second polarized light to the first polarized light and output the converted first polarized light; and a second phase delaying member configured to further delay the second polarized light by $\lambda/4$ to output a circular polarized light.

In an embodiment, the second phase delaying member may be a quarter wave delaying film.

In an embodiment, when a voltage corresponding to a first level is applied to the second LC panel, the second LC panel may transition to an on state, and when a voltage corresponding to a second level is applied, transition to an off state.

In an embodiment, the second LC panel selectively may output the first polarized light or the second polarized light depending on whether a voltage corresponding to the first level or the second level is applied.

In an embodiment, when a first polarized light is outputted from the first optical switch module, the second optical switch module may output a first polarized light converted from a second polarized light to synthesize each first polarized light, and when a second polarized light converted from a first polarized light is outputted from the first optical switch module, the second optical switch module may output a second polarized light to synthesize each second polarized light In an embodiment, any one of the light splitter and the light reflection module may have a one-side end portion bent in a shape curved in a specific direction to superimpose an image focused on a screen by the first and second polarized light.

In an embodiment, any one of the light splitter and the light reflection module may be tilted at a predetermined angle in a specific direction.

Advantageous Effects

Since a stereoscopic image display device according to the present invention uses a single liquid crystal panel rather than a plurality of liquid crystal (LC) panels in each optical switch module, the thickness of the optical switch module may be reduced to minimize the volume of the display device.

In addition, since the light from each optical switch module is projected on a screen and has the same polarized component, synthesis is possible, and since the luminance of the synthesized light is proportional to a synthesis ratio, the luminance of the light projected on the screen corresponds to the incident light, so that the luminance is increased as compared with the conventional stereoscopic image display technology.

Further, since each optical switch module uses one LC panel, the present invention has an advantage that the structure is simple compared with the conventional stereoscopic image display technology using two overlapping LC panels.

In addition, since the present invention uses one LC panel per one optical switch module rather than the conventional two LC panels, it has an advantage that the brightness increases.

Further, since a reflective layer is coated on the surface of a polarizing beam splitter that forms a specific pattern through at least one split surface in correspondence to the incident angle of the incident light for each split surface, the light transmittance between the central portion and the end portion of the polarizing beam splitter may be maintained.

MODE FOR CARRYING OUT THE INVENTION

Hereinafter, preferred embodiments will be described in order to help understanding the present invention. However, the following embodiments are provided only for easier understanding of the present invention, and the contents of the present invention are not limited by the embodiments.

Figure 1:
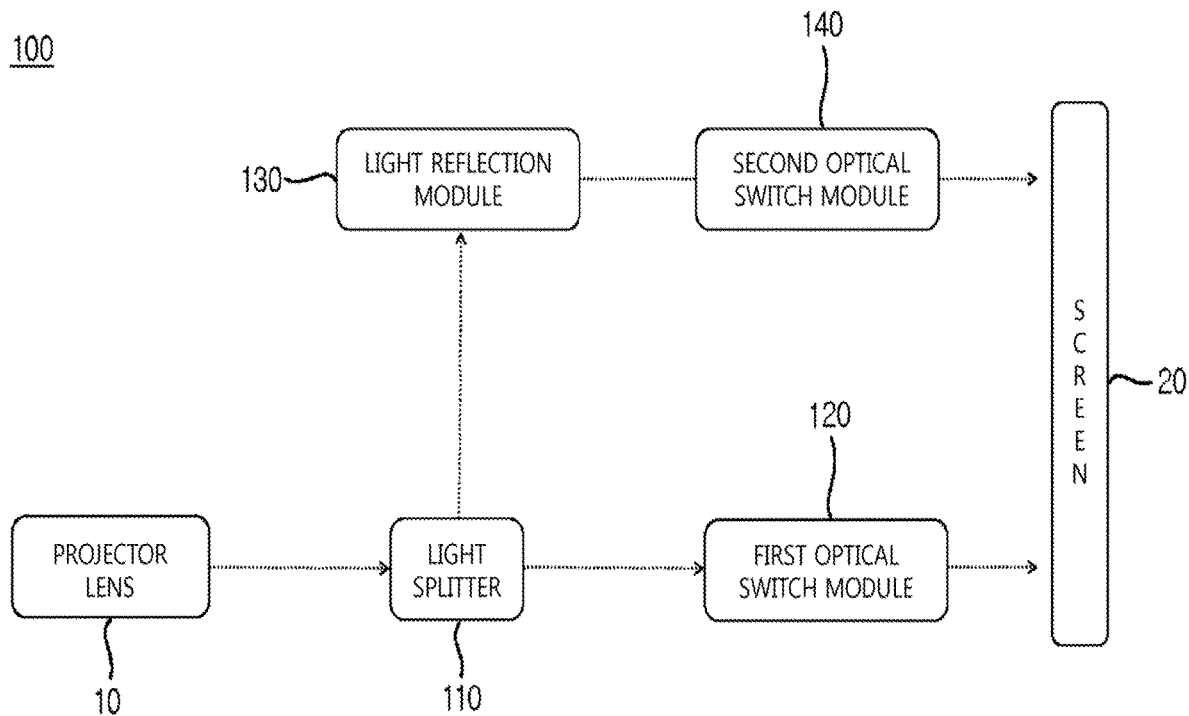
FIG. 1 is a view schematically illustrating a configuration of a stereoscopic image display device 100 according to an embodiment of the present invention.
Figure 2:
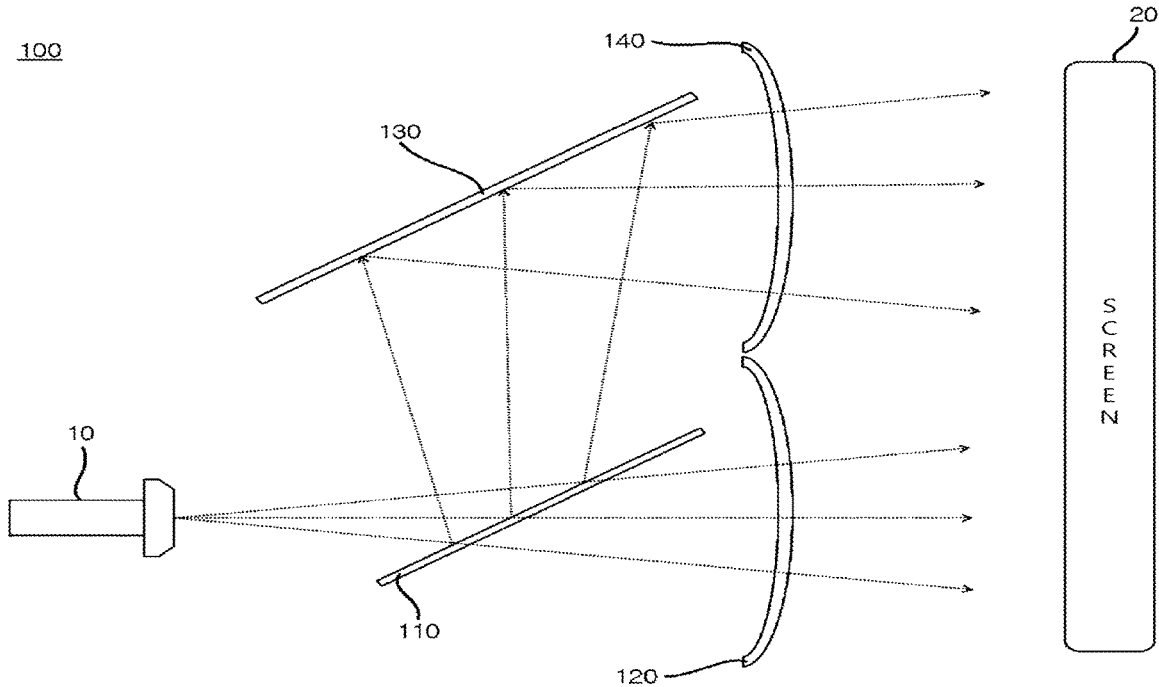
FIG. 2 is a view schematically illustrating a shape of a stereoscopic image display device 100 shown in FIG. 1.

FIG. 1 is a view schematically illustrating a configuration of a stereoscopic image display device 100 according to an embodiment of the present invention and FIG. 2 is a view schematically illustrating a shape of a stereoscopic image display device 100 shown in FIG. 1.

Referring to FIGS. 1 and 2, the stereoscopic image display device 100 according to the present invention includes a light splitter 110, a first optical switch module 120, a light reflection module 13, and a second optical switch module 140.

First, the light splitter 110 may serve to split the incident light incident from a projector lens 10 into a first polarized light and a second polarized light according to a polarized component, and then transmit the first polarized light and reflect the second polarized light again in at least one direction.

Here, the polarized component may refer to a vibration direction of an electric vector of incident light, and for example, the incident light incident from the projector lens 10 corresponds to a transverse wave including both a vertical polarized component perpendicular to a normal (progressing direction) and a horizontal polarized component horizontal to the normal and at this time, the horizontal polarized component may refer to the first polarized light of the present invention and the vertical polarized component may refer to the second polarized light of the present invention.

The light splitter 110 splits it into such horizontal polarized light and vertical polarized light and provide them to the first optical switch module 120 and the second optical switch module 140, respectively, and the reason for this is that since the light polarized as passing through a horizontally polarizing plate 121 or a vertically polarizing plate 141 described later and provided in the first and second optical switch modules 120 and 140 is reduced in luminance by half, the first and second polarized lights passing through the first and second optical switch modules 120 and 140 are synthesized (or superimposed) to complement the luminance.

Such the light splitter 110 is also referred to as a Polarizing Beam Splitter (PBS), and splits the incident light into a polarized light by a first polarized light and a second polarized light by using birefringent crystals, transmits the first polarized light (horizontal polarized light) through the light splitter 110 as it is, and reflects the second polarized light (vertical polarized light) in one or more directions corresponding to the incident angle through a cube-shaped prism or a planar plate-shaped light splitter provided inside to be reflected to the light reflection module 130 described later.

Meanwhile, the light splitter 110 may reflect the second polarized light in at least one direction, and accordingly, by reflecting it in more directions such as 2-way beam and 3-way beam, reduce the reflection angle of the reflected light so that the overall size of the stereoscopic image display device 100 may be reduced.

In an embodiment, the light splitter 110 may have one or more split surfaces corresponding to the incident angle of incident light, and this will be described in more detail with reference to FIGS. 3 and 4.

Figure 3:
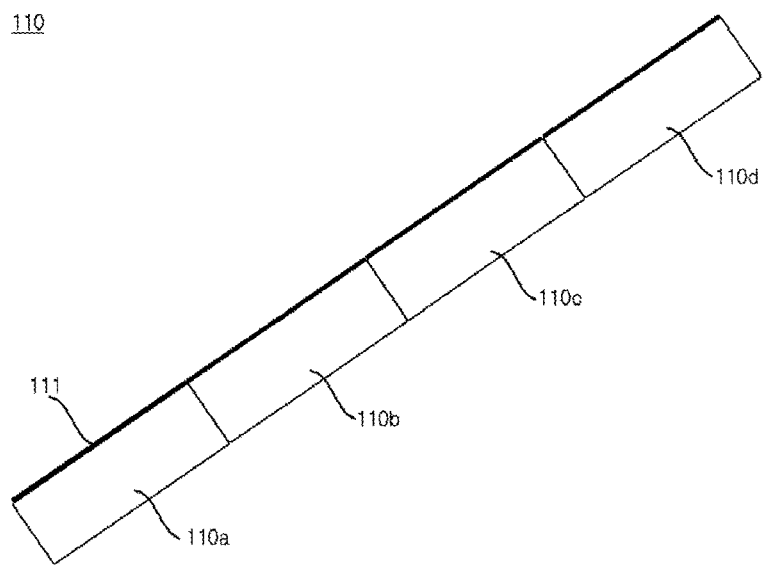
FIG. 3 is a more detailed view illustrating a configuration of a light splitter 110 shown in FIG. 2.
Figure 4:
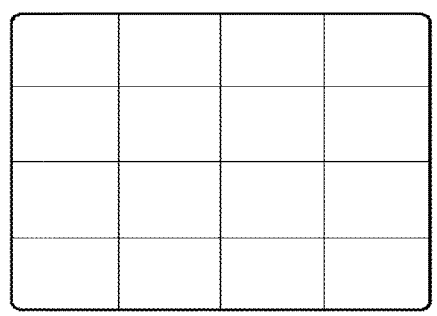
FIG. 4 is a view schematically illustrating a pattern shape formed by at least one split surface of a light splitter 110 shown in FIG. 2.
Figure 4:
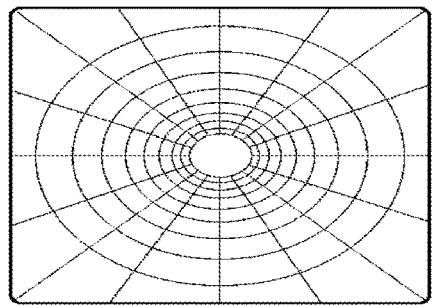
Figure 4:
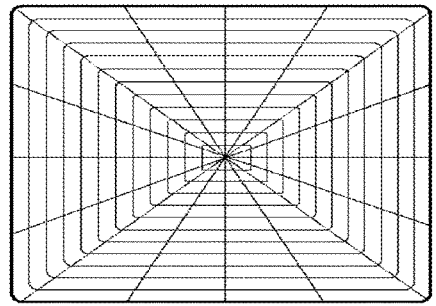

FIG. 3 is a more detailed view illustrating a configuration of the light splitter 110 shown in FIG. 2 and FIG. 4 is a view schematically illustrating a pattern shape formed by at least one split surface of the light splitter 110 shown in FIG. 2.

Referring to FIG. 3, the light splitter 110 may be formed in a shape in which several split portions such as a first light splitter 110a to a fourth light splitter 110d are bonded and the first to fourth splitters 110a, 110b, 110c, and 110d may be gathered to have a specific pattern shape.

Referring to FIG. 4, each split surface may be gathered to form various shapes of patterns such as a lattice pattern as shown in FIG. 4(a), a circular lattice pattern as shown in FIG. 4(b), or a square lattice pattern as shown in FIG. 4(c), and in addition to the above-described pattern shapes, various patterns such as a grid pattern, a polarized light pattern, a polarized light recycle pattern, a spherical pattern, an aspherical pattern, a circular pattern, and the like may all be included.

In an embodiment, each of the split surfaces may be coated with a reflective layer 111 to correspond to incident light incident thereon.

Therefore, when the incident light is incident on the light splitter 110, since the reflective layer 111 is coated to allow each of the split surfaces to correspond to the incident angle of the incident light, the light transmittance between the central portion and the end portion of the light splitter 110 may be maintained constant without deterioration.

In an embodiment, the light splitter 110 may be formed in a shape with a one-side end portion curved in a specific direction so as to superimpose an image focused on the screen 20 by the first and second polarized lights, and as a result, the image focused on the screen 20 may be displayed more clearly, and also the luminance may be improved.

In an embodiment, the light splitter 110 may be formed to be tilted by a predetermined angle in a particular direction, and this is for matching the image focused on the screen 20 to the center portion of the screen 20 by the first and second polarized light and allowing a user to freely change the size and position of the image.

On the other hand, although the light splitter 110 is described as being formed of the first to fourth light splitter 110a, 110b, 110c, and 110d in the specification of the present invention, it should be noted that the number of split surfaces is not limited to the number of the first to fourth light splitters.

Next, the first optical switch module 120 may serve to covert the first polarized light into the second polarized light and output it by delaying and outputting the phase of the first polarized light or further delaying and outputting the phase of the first polarized light whose phase is delayed.

The first optical switch module 120 will be described in more detail with reference to FIGS. 5 and 6.

Figure 5:
FIG. 5 is a view more specifically illustrating shapes of a first optical switch module 120 and a second optical switch module 140 shown in FIG. 2.
Figure 6:
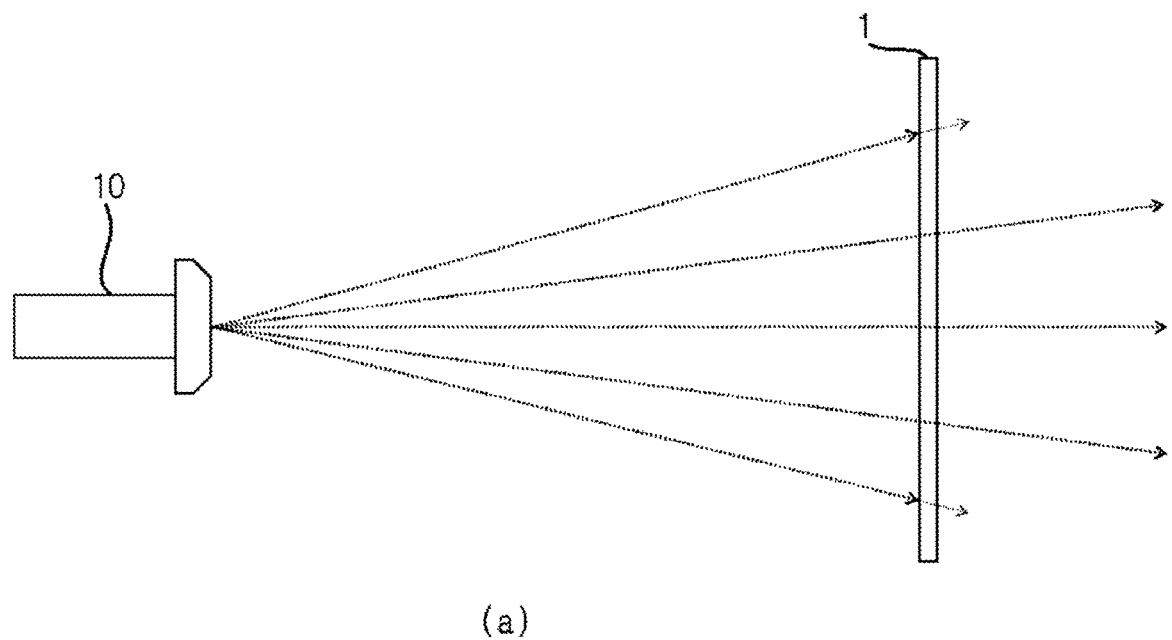
FIG. 6 is a view comparing and describing the shape of a first optical switch module 120 shown in FIG. 2 with a conventional optical switch module 1.
Figure 6:
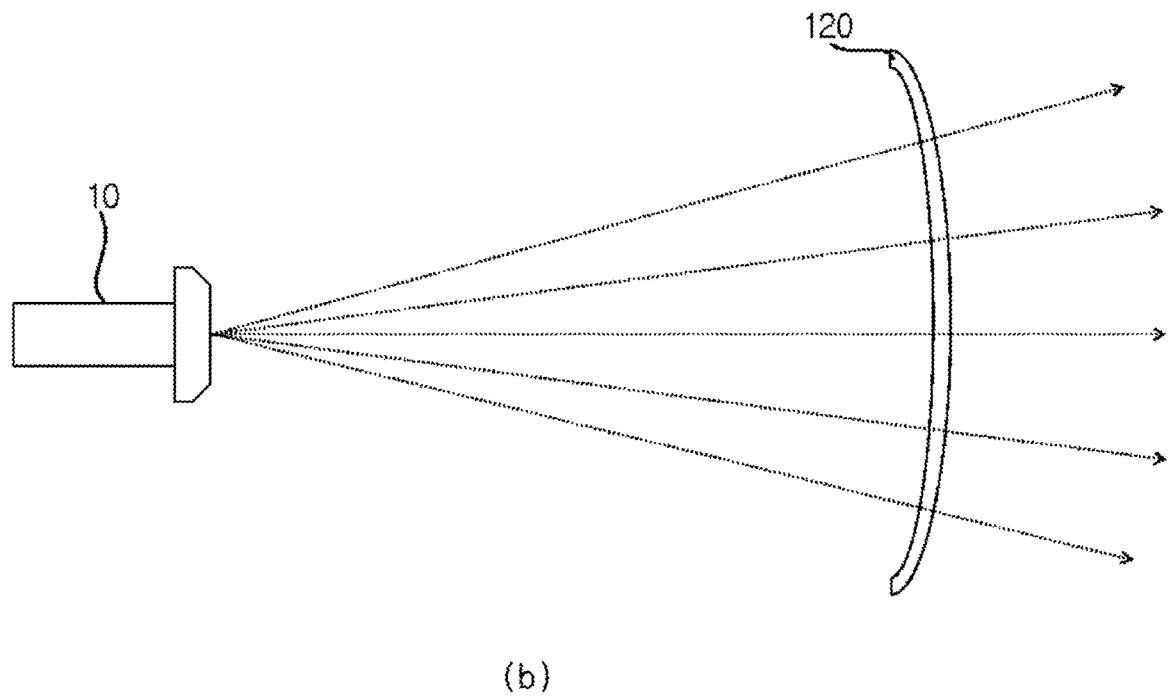

FIG. 5 is a view more specifically illustrating the shapes of the first optical switch module 120 and the second optical switch module 140 shown in FIG. 2, and FIG. 6 is a view comparing and describing the shape of the first optical switch module 120 shown in FIG. 2 with the conventional optical switch module 1.

Referring to FIGS. 5 and 6, the first optical switch module 120 may be configured including a horizontally polarizing plate 121, a first liquid crystal (LC) panel 122, and a first phase delaying member 123.

The horizontally polarizing plate 121 may serve to linearly polarize the first polarized light in a horizontal direction and as a voltage corresponding to a first level is applied, the first LC panel 122 may serve to convert it to the second polarized light and output it by delaying the phase of the first polarized light by $\lambda/2$.

Here, the voltage corresponding to the first level may mean a voltage value capable of turning on the first LC panel 122 and the second LC panel 142 described later, and a voltage corresponding to a second level described below may mean a voltage value capable of turning off the first LC panel 122 and the second LC panel 142 described later.

When the phase of the first polarized light is delayed by $\lambda/2$ through the first LC panel 122 and is converted into the second polarized light, it is synthesized with the second polarized light outputted from the second optical switch module 140 described later, so that the second polarized light whose luminance is doubled may be projected onto the screen 20.

At this time, the first LC panel 122 becomes in an On state by applying the voltage corresponding to the first level to the first LC panel 122 to delay the phase of the first polarized light by $\lambda/2$ and in this case, the second LC panel 142 becomes in an Off state by applying the voltage corresponding to the second level.

That is, when the voltage corresponding to the first level is applied to the first LC panel 122, the first polarized light having a phase delayed by $\lambda/2$ may be outputted to the first phase delaying member 123, and If the voltage corresponding to the second level is applied, the first polarized light having a phase not delayed may be directly outputted and delivered to the first phase delaying member 123, and accordingly, a circular polarized light delayed by $\lambda/4$ may be outputted finally.

In this case, the second polarized light may be outputted from the second optical switch module 140 described later, and may be synthesized with the second polarized light outputted through the first optical switch module 120, and may be projected on the screen 20.

The first phase delaying member 123 may further delay the phase of the first polarized light, which becomes linear polarized light, by $\lambda/4$ to output the circular polarized light.

Here, the first phase delaying member 123 may correspond to a birefringent material (e.g., a quarter wave delaying film) having a birefringence characteristic, and cause birefringence of the first polarized light so that a circular polarized light additionally delayed by $\lambda/4$ may be outputted.

On the other hand, the incident light outputted from the project lens 10 has a specific image shape and at this time, the image may be transmitted from the project lens 10 according to a specific frame.

At this time, in relation to an image transmitted from the project lens 10, the left and right image frames may be transmitted continuously and at this time, in synchronization with the transmitted image frame, the first and second optical switch modules 120 and 140 may selectively transmit or block transmitted light and reflected light. At this time, a polarized light filter may be coated on the left glass and the right glass of a polarized light glasses (not shown) worn by a user to provide a phase difference of 90 degrees, and in order to output the left frame transmitted from the project lens 10, the first and second optical switch modules 120 and 140 selectively output only the first polarized light (or the second polarized light) in synchronization with the corresponding left frame, and at this time, the left frame is transmitted to the left eye of the user through the left lens of the polarized light glasses. In the same manner, in order to output the right frame transmitted from the project lens 10, the first and second optical switch modules 120 and 140 selectively output only the second polarized light (or the first polarized light) in synchronization with the corresponding right frame, and at this time, the right frame is transmitted to the right eye of the user through the right lens of the polarized light glasses. Therefore, a binocular parallax occurs between the left eye and the right eye, so that the user may feel the 3D feeling.

In an embodiment, the first optical switch module 120 may be formed in a curved surface shape such as a convex mirror rather than a flat planar surface shape, and accordingly, even if a separate wide view film is not provided, the viewing angle of the first optical switch module 120 may be widened to broaden the area of the polarized light projected on the screen 20.

FIG. 6(*a*) is a view illustrating a conventional planar optical switch module 1. Referring to FIG. 6(*a*), in the case of the conventional planar optical switch module 1, since the viewing angle is limited by the flat surface, a picture projected on the screen 20 becomes blurred toward the edge of the optical switch module, and in order to solve this problem, a separate wide view film (not shown) is attached to one side of the conventional planar optical switch module 1 in order to supplement this.

FIG. 6(*b*) is a view illustrating a shape of a first optical switch module 120 according to an embodiment of the present invention. Referring to FIG. 6(*b*), in the case of the first optical switch module 120, as it becomes toward the edge, a bent (curved) shape that is convex toward the screen 20 is formed, and when light is incident on the first optical switch module 120, the viewing angle of the light projected onto the screen 20 becomes widened by the curved shape of the first optical switch module 120.

On the other hand, although only the first optical switch module 120 is shown and described with reference to FIG. 6, since the first optical switch module 120 and the second optical switch module 140 may have the same shape, it should be noted that the first optical switch module 120 shown in FIG. 5 may also be applied as the second optical switch module 140.

Next, in relation to the light reflection module 130, in the case of the light splitter 110, because it uses a cube-shaped prism or a flat-plate-shaped light splitter when splitting horizontal polarized light and vertical polarized light by polarizing light, due to the reflection angle of a prism or a flat plate, the vertical polarized light may be reflected in a direction different from the horizontal polarized light. Accordingly, the light reflection module 130 may serve to re-reflect the first polarized light or the second polarized light reflected through the prism of the light splitter 110 to the second optical switch module 140 described later.

In an embodiment, the light reflection module 130 may be formed foldable and in addition, since the reflection surface has a curved shape at a predetermined angle, the first polarized light or the second polarized light reflected by the light reflection module 130 may be intensively reflected at a predetermined angle toward the screen 20 without spreading at a specific angle, so that the degree of integration of the light projected onto the screen 20 may be increased.

Next, the second optical switch module 140 may be configured including a vertically polarizing plate 141 for performing a role corresponding to the first optical switch module 120 described above and linearly polarizing the second polarized light (vertical polarized light) polarized from the light splitter 110 in a vertical direction, a second LC panel 142 for delaying the phase of the second polarized light by λ/2 as the voltage corresponding to the first level is applied and converting the second polarized light into the first polarized light and outputting it, and a second phase delaying member 143 for further delaying the second polarized light that is linearly polarized light by λ/4 to output a circular polarized light.

Here, since the voltage corresponding to the first level and the second level is the same as the voltage described in the first optical switch module 120, the description will be omitted.

Since the role of the vertically polarizing plate 141 corresponds to the role of the horizontally polarizing plate 121 described above and the role of the second phase delaying member 143 corresponds to the role of the first phase delaying member 123 described above, the detailed description will be omitted.

However, the second phase delaying member 143 may perform a role for outputting a circular polarized light by further delaying the phase by λ/4 as causing birefringence of the second polarized light, and may correspond to a quarter wave delaying film like the first phase delaying member 123.

When the voltage corresponding to the first level is applied to the second LC panel 142, the second polarized light having a phase delayed by λ/2 may be outputted to the second phase delaying member 143, and If the voltage corresponding to the second level is applied, the second polarized light having a phase not delayed may be directly outputted and delivered to the second phase delaying member 143, and accordingly, a circular polarized light delayed by λ/4 may be outputted finally.

Accordingly, the first polarized light outputted from the second LC panel 142 and the first polarized light outputted from the first LC panel 122 may be synthesized, and accordingly, the first polarized light having a doubled luminance may be projected on the screen 20.

In one embodiment, when the voltage corresponding to the first level is applied to the first LC panel 122 and it is changed to an on state to output the converted second polarized light, the second LC panel 142 is changed to an off state when the voltage corresponding to the second level is applied, and the second polarized light may be outputted to synthesize each second polarized light and then, when the first LC panel 122 is changed to an off state to output the first polarized light, the voltage corresponding to the first level is applied to the second LC panel 142 and it is changed to an on state, so that the converted first polarized light may be outputted to synthesize each first polarized light.

Thus, as each synthesized first polarized light or second polarized light is projected on the screen 20, the first polarized light or the second polarized light with a doubled luminance may be projected on the screen 20.

As above, the stereoscopic image display device according to the present invention may polarize the incident light into first and second polarized lights through the light splitter 110 and split it using a prism, and delay the phase of each polarized light through the first and second optical switch modules 120 and 140, and in particular, apply a voltage corresponding to a specific level to the first and second optical switch modules 120 and 140 to turn them on or off, thereby outputting a polarized light having the same polarization component through the first and second optical switch modules 120 and 140 and synthesizing each polarized light having the same polarization component and projecting it on the screen 20, so that light having doubled luminance may be projected on the screen 20.

While descriptions are made above with reference to the preferred embodiments of the present invention, it will be understood by those skilled in the art that various changes and modifications are possible without departing from the spirit and scope of the present invention as defined in the following claims.

What is claimed is:

1. A stereoscopic image display device comprising:
a light splitter configured to split an incident light transmitted from a projector into a first polarized light and a second polarized light according to a polarization component and then transmit the first polarized light and reflect the second polarized light in at least one direction;
a first optical switch module configured to delay and output a phase of the first polarized light, or further delay the phase to convert the first polarized light into the second polarized light and output the converted second polarized light;
a second optical switch module configured to delay a phase of the second polarized light reflected in the at least one direction and output the second polarized light, or further delay the phase to convert the second polarized light into the first polarized light and output the converted first polarized light; and
a light reflection module configured to reflect the second polarized light reflected in the at least one direction from the light splitter toward a direction of the second optical switch module,
wherein the first optical switch module comprises:
a horizontally polarizing plate configured to linearly polarize the first polarized light in a horizontal direction;
a first liquid crystal (LC) panel configured to delay a phase of the linearly-polarized first polarized light by λ/2 as a voltage corresponding to a first level is applied to convert the first polarized light into the second polarized light and output the second polarized light; and
a first phase delaying member configured to further delay the second polarized light by λ/4 to output a circular polarized light,
wherein the second optical switch module comprises:
a vertically polarizing plate configured to linearly polarize the second polarized light in a vertical direction;
a second LC panel configured to delay a phase of the linearly-polarized second polarized light by λ/2 as a voltage corresponding to a first level is applied to convert the second polarized light to the first polarized light and output the converted first polarized light; and
a second phase delaying member configured to further delay the second polarized light by λ/4 to output a circular polarized light.

2. The device of claim 1, wherein the light splitter has at least one split surface corresponding to an incident angle of an incident light, and the light splitter has a specific pattern shape through the at least one split surface.

3. The device of claim 2, wherein at least a portion of the at least one split surface is coated with a reflective layer in correspondence to the incident angle of the incident light.

4. The device of claim 1, wherein the first and second optical switch modules have both-side end portions bent in a shape curved in one side direction.

5. The device of claim 1, wherein the first and second optical switch modules selectively output any one of the first polarized light and the second polarized light in synchronization with an image frame transmitted from the projector.

6. The device of claim 1, wherein the first phase delaying member is a quarter wave delaying film.

7. The device of claim 1, wherein when a voltage corresponding to a first level is applied to the first LC panel, the first LC panel transitions to an on state, and when a voltage corresponding to a second level is applied, transitions to an off state.

8. The device of claim 7, wherein the first LC panel selectively outputs the first polarized light or the second polarized light depending on whether a voltage corresponding to the first level or the second level is applied.

9. The device of claim 1, wherein the second phase delaying member is a quarter wave delaying film.

10. The device of claim 1, wherein when a voltage corresponding to a first level is applied to the second LC panel, the second LC panel transitions to an on state, and when a voltage corresponding to a second level is applied, transitions to an off state.

11. The device of claim 10, wherein the second LC panel selectively outputs the first polarized light or the second polarized light depending on whether a voltage corresponding to the first level or the second level is applied.

12. The device of claim 1, wherein when a first polarized light is outputted from the first optical switch module, the second optical switch module outputs a first polarized light converted from a second polarized light to synthesize each first polarized light, and when a second polarized light converted from a first polarized light is outputted from the first optical switch module, the second optical switch module outputs a second polarized light to synthesize each second polarized light.

13. The device of claim 1, wherein any one of the light splitter and the light reflection module has a one-side end portion bent in a shape curved in a specific direction to superimpose an image focused on a screen by the first and second polarized light.

14. The device of claim 1, wherein any one of the light splitter and the light reflection module is tilted at a predetermined angle in a specific direction.

* * * * *

UNITED STATES PATENT AND TRADEMARK OFFICE
CERTIFICATE OF CORRECTION

PATENT NO.       : 10,663,851 B2
APPLICATION NO.  : 16/087105
DATED            : May 26, 2020
INVENTOR(S)      : Sang Su Kim It is certified that error appears in the above-identified patent and that said Letters Patent is hereby corrected as shown below:

On the Title Page

Item (71), Applicants should read:
Hung Yu, Kowloon Hong Kong (HK)

Signed and Sealed this
Fifth Day of January, 2021

Andrei Iancu
*Director of the United States Patent and Trademark Office*